United States Patent
Palaniappan et al.

(10) Patent No.: US 9,170,821 B1
(45) Date of Patent: Oct. 27, 2015

(54) AUTOMATING WORKFLOW VALIDATION

(75) Inventors: Ramanathan Palaniappan, Seattle, WA (US); Gideon Shavit, Seattle, WA (US); Alan M. Steele, Seattle, WA (US); Simon K. Johnston, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 252 days.

(21) Appl. No.: 13/569,537

(22) Filed: Aug. 8, 2012

(51) Int. Cl.
G06F 9/44 (2006.01)
G06Q 10/06 (2012.01)
G06F 11/07 (2006.01)

(52) U.S. Cl.
CPC .............. *G06F 9/44* (2013.01); *G06F 11/0751* (2013.01); *G06Q 10/0633* (2013.01)

(58) Field of Classification Search
None
See application file for complete search history.

(56) References Cited

U.S. PATENT DOCUMENTS

| | | | |
|---|---|---|---|
| 5,937,388 A | 8/1999 | Davis et al. | |
| 5,987,422 A * | 11/1999 | Buzsaki | 705/7.13 |
| 6,182,245 B1 * | 1/2001 | Akin et al. | 714/38.14 |
| 2003/0018508 A1 | 1/2003 | Schwanke | |
| 2004/0019512 A1 | 1/2004 | Nonaka | |
| 2004/0254768 A1 | 12/2004 | Kim et al. | |
| 2006/0179422 A1 * | 8/2006 | Gortler | 717/124 |
| 2006/0195347 A1 | 8/2006 | Bultmeyer et al. | |
| 2008/0243902 A1 | 10/2008 | Rong et al. | |
| 2009/0281865 A1 | 11/2009 | Stoitsev | |
| 2011/0055673 A1 | 3/2011 | Teng et al. | |
| 2011/0113287 A1 * | 5/2011 | Gururaj | 714/37 |
| 2013/0219226 A1 * | 8/2013 | Hachmeister et al. | 714/38.1 |

* cited by examiner

*Primary Examiner* — Emerson Puente
*Assistant Examiner* — Zhi Chen
(74) *Attorney, Agent, or Firm* — Thomas Horstemeyer, LLP

(57) ABSTRACT

A test document associated with a workflow definition is obtained, the test document including an input for an action of the workflow definition and an expected state for the workflow definition based on the input. The input is delivered for the action of a workflow instance, the workflow instance being an instance of the workflow definition executed by a workflow engine, and the action determined based upon a present state of the workflow instance. A next state of the workflow instance is obtained, where the next state is determined by the workflow engine based upon the present state, the action and the input. The next state of the workflow instance is compared to the expected state of the test document.

24 Claims, 5 Drawing Sheets

AUTOMATING WORKFLOW VALIDATION

BACKGROUND

Workflow management systems typically model a business process by defining a workflow comprising a set of tasks to produce a result. Complex business processes may necessitate complex workflows. It can be difficult to validate workflows with current technologies that do not offer the flexibility needed to handle significant complexity.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Disclosed are various embodiments facilitating validation of the operation of one or more actions of a workflow. A workflow definition may contain many possible paths through the various possible actions of a workflow. In order to verify that the workflow definition operates as expected, a test document may be created that specifies input for one or more of actions of the workflow definition, as well as a corresponding expected state resulting from each of the specified actions. In some embodiments, portions of the test document may be created by a synthesis engine based upon the history from prior instances of the workflow definition.

To begin the validation, a test engine may obtain the test document specifying input to one or more actions of a workflow instance associated with the workflow definition. The test engine may provide the input to a workflow engine executing the workflow instance, then validate that the post-action state of the workflow instance matches the expected state specified in the test document. The expected state may be used to ensure that the workflow instance takes the proper path through the actions of the workflow definition, and that the history for the workflow instance is updated correctly. In the following discussion, a general description of the system and its components is provided, followed by a discussion of the operation of the same.

Figure 1:
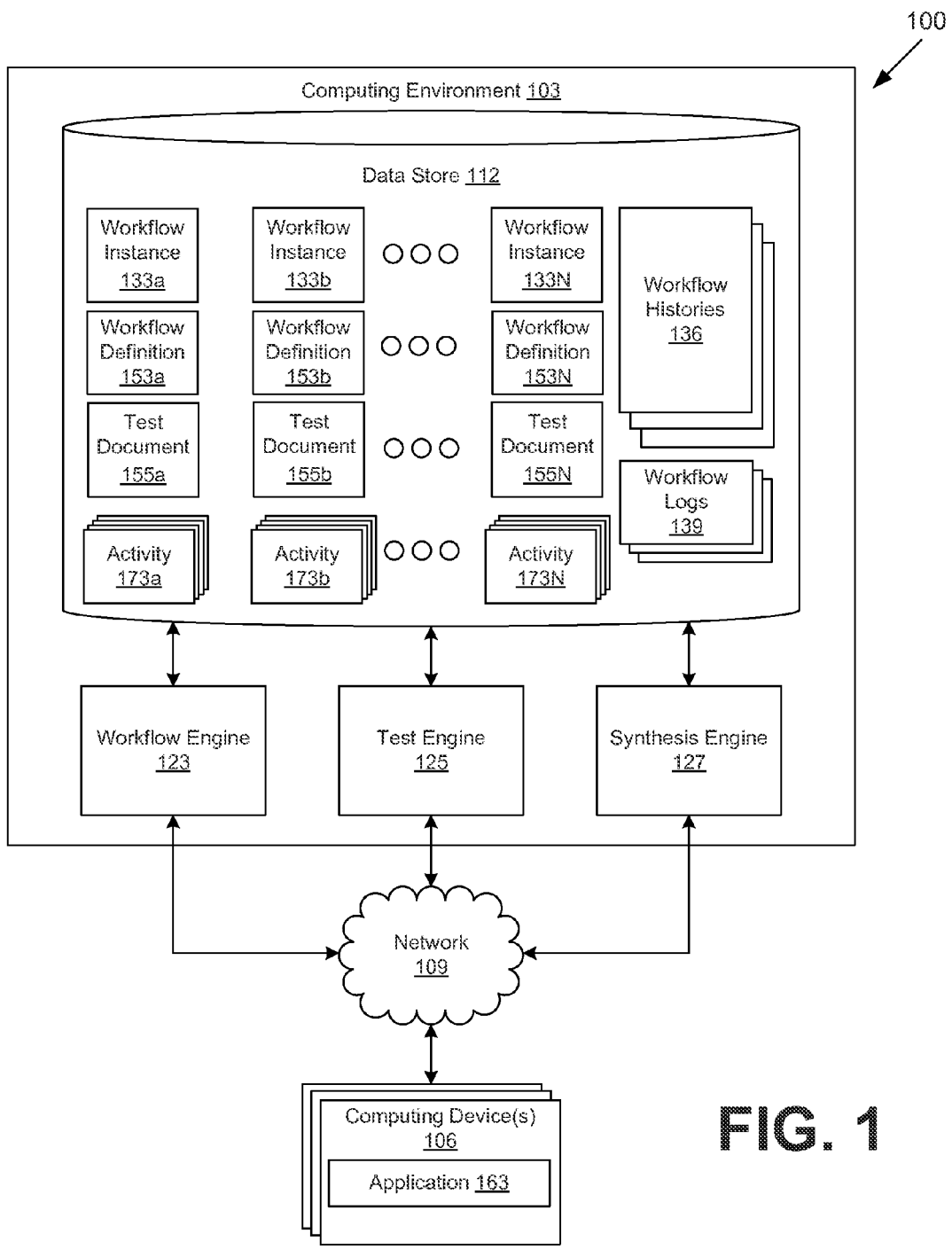
FIG. 1 is a drawing of a networked environment according to various embodiments of the present disclosure.

With reference to FIG. 1, shown is a networked environment 100 according to various embodiments. The networked environment 100 includes a computing environment 103 in data communication with one or more computing devices 106 by way of a network 109. The network 109 includes, for example, the Internet, intranets, extranets, wide area networks (WANs), local area networks (LANs), wired networks, wireless networks, or other suitable networks, etc., or any combination of two or more such networks.

The computing environment 103 may comprise, for example, a server computer or any other system providing computing capability. Alternatively, the computing environment 103 may comprise a plurality of servers or other computing devices that are arranged, for example, in one or more server banks or computer banks or other arrangements. For example, the computing environment 103 may comprise a cluster computing resource, a grid computing resource, and/or any other distributed computing arrangement. The computing environment 103 may be located in a single installation or may be distributed among many different geographical locations.

Various applications and/or other functionality may be executed in the computing environment 103 according to various embodiments. Also, various data is stored in a data store 112 that is accessible to the computing environment 103. The data store 112 may be representative of a plurality of data stores 112 as can be appreciated. The data stored in the data store 112, for example, is associated with the operation of the various applications and/or functional entities described below.

The components executed on the computing environment 103, for example, include a workflow engine 123, a test engine 125, a synthesis engine 127, and other applications, services, processes, systems, engines, or functionality not discussed in detail herein. The workflow engine 123 is executed to orchestrate and execute instances of workflows ("workflow instances") as will be described. The workflow engine 123 is a generic workflow processor that may embody a functional expression of a given workflow definition. Accordingly, the workflow engine 123 is a stateless entity that processes the workflow instances according to the respective workflow definition and workflow history. In this respect, the workflow engine 123 is configured to identify the activities, actions, or steps to be performed for a specific workflow instance based upon the respective workflow definition as will be described. In one embodiment, the workflow engine 123 comprises a class that may be instantiated multiple times. Thus, there may be many instances of various workflow engines 123 executed by the computing environment 103 at any given time.

The test engine 125 is executed to facilitate automated testing of workflow instances according to a pre-defined test document. The test engine 125 may communicate with the workflow engine 123 and/or other services using various protocols such as, for example, simple object access protocol (SOAP), representational state transfer (REST), remote procedure call (RPC), and/or other protocols for inter-process communication. The synthesis engine 127 is executed to generate testing scenarios used within the test documents based upon prior executions of workflow instances. In order to produce the testing scenarios, the synthesis engine 127 may examine the workflow logs produced by the workflow engine 123 during the execution of the various workflow instances.

The data stored in the data store 112 includes, for example, several workflow instances 133a-N, workflow histories 136, workflow logs 139, several workflow definitions 153a-N, several test documents 155a-N, several activities 173a-N, and potentially other data. Each workflow instance 133 is an instance of a given workflow definition 153 and may be represented by the data making up the workflow instance 133 in its entirety, or a workflow instance 133 may be represented by virtue of an identifier that is associated with data embodying a workflow instance 133 stored elsewhere. The workflow represented by each workflow instance 133 is orchestrated by the workflow engine 123.

Each workflow history 136 is associated with a respective one of the workflow instances 133 processed by the workflow engine 123. The workflow histories 136 each comprise, for example, a list of events that have occurred during the execution of a given workflow instance 133 over time. To this end, the events listed in a given workflow history 136 act as a record of the execution of a workflow instance 133. Such events may be expressed using, for example, extensible markup language (XML), JavaScript object notation (JSON), or other such languages. Individual workflow logs 139 include various data related to corresponding workflow instances 133a-N executed previously by the workflow engine 123. The workflow logs 139 may include the workflow history 136 for a given workflow instance 133, identifiers for the workflow instance 133 and the associated workflow definition 153, data used as input for various states of the workflow instance 133, exceptions or errors reported during execution of the workflow instance 133, and/or other data associated with a previous execution of one or more workflow instances 133a-N.

Each workflow definition 153 defines the activities, actions, and/or steps (collectively referred to as the "actions") to be carried out for each associated workflow instance 133. In some embodiments, the actions of a workflow definition 153 may comprise one or more subordinate tasks ("subtasks"). In some embodiments, the workflow instance may not progress to the next action until each of the sub-tasks is complete. In other embodiments, the workflow instance 133 may progress to the next action concurrently with the execution of the sub-tasks. The workflow definition 153 may be expressed using, for example, XML process definition language (XPDL), business process execution language (BPEL), or other workflow process definition languages.

Each test document 155 corresponds to a workflow definition 153 and provides an input for one or more states of a workflow instance 133 under test and a corresponding expected resulting state for the workflow instance 133. In some embodiments, a test document 155 may be represented as an extensible markup language (XML) document or a JavaScript Object Notation (JSON) document. The test document 155 may provide an input for a subset of the possible states along one or more possible paths of execution of the workflow definition 153. In some embodiments, the test document 155 may provide inputs for one or more sub-tasks of an action within the workflow definition 153. In other embodiments, the test document 155 may specify a responsive action to initiate in the event that the expected resulting state of the workflow instance 133 under test does not match the actual resulting state of the workflow instance. As a non-limiting example, the responsive action may comprise logging the event, generating an alarm, repeating the action that resulted in the unexpected state, restarting the workflow instance 133 under test, and/or other possible responsive actions.

Each of the activities 173 may be executed by the computing environment 103 to perform or facilitate performance of one or more actions, tasks, or functions that comprise at least a portion of a given workflow instance 133 based upon a request from the workflow engine 123 as will be described. The activities 173 may facilitate performance of one or more actions, tasks, or functions of a given workflow instance 133 by, for example, initiating execution of one or more applications, providing notice to assignees of tasks, monitoring performance of the tasks, and/or other methods of facilitation as can be appreciated. In some embodiments, the actions, tasks, or functions facilitated by the activities 173 may be performed asynchronously. In other embodiments, the applications initiated by the activities 173 may be performed in computing devices remote to the computing environment 103. The activities 173 may comprise a class that is instantiated multiple times to handle the workflow processing load from the workflow engine 123 as will be described.

The computing device or devices 106 may comprise, for example, a server computer or any other system providing computing capability. Alternatively, the computing device 106 may comprise a plurality of servers or other computing devices that are arranged, for example, in one or more server banks or computer banks or other arrangements. For example, the computing device 106 may comprise a cluster computing resource, a grid computing resource, and/or any other distributed computing arrangement. The computing device 106 may be located in a single installation or may be distributed among many different geographical locations.

The components executed on the computing device or devices 106, for example, include an application 163 and other applications, services, processes, systems, engines, or functionality not discussed in detail herein. The application 163 is executed to perform one or more actions of a given workflow instance 133. The application 163 may obtain input for the actions to be performed for a workflow instance 133 and may return the result of the action based upon the input. As a non-limiting example, the application 163 may perform the action of initiating shipment of the items from a paid order. The application 163 may obtain an order number as input, then provide a shipment confirmation number as a result of the action performed.

The networked environment 100 is configured to execute workflow instances 133 that perform various functions. One example of such a workflow that may be embodied in workflow instances 133 might be a process to implement the payment for a purchase of an item online over the Internet. Such a process may involve various actions or tasks such as inputting a payment instrument such as a credit card number or other instrument, performing a fraud check on the payment instrument, and sending a shipment request to a fulfillment center to implement the fulfillment of the order. There may be many other actions or tasks involved in such a process, where the above actions or tasks are described merely for the purposes of illustration.

To this end, a workflow may involve various components, persons, applications, and other entities that are involved in the processing of data to complete a workflow instance 133. In the case of the processing of payment for an order, for example, such an order may be processed through various departments and other entities for ultimate authorization and purchase. A given workflow instance 133 may involve human intervention at some point, or may be entirely automated. The human intervention may involve interaction with a given activity 173 on the part of an individual as can be appreciated.

Next, a general discussion of the networked environment 100 is described with respect to the execution of various workflow instances 133 according to various embodiments. To begin, an operator or an application external to the networked environment 100 may interact with a test engine 125 to initiate testing of a particular workflow definition 153. To this end, a test document 155 associated with the workflow definition 153 may be obtained by the test engine 125. In response, the test engine 125 may create or initiate creation of a workflow instance 133 associated with the workflow definition 153 under test. The workflow engine 123 ultimately orchestrates the execution of the workflow instance 133, while the direction and input necessary for the execution of the workflow instance 133 is provided by the test engine 125 based upon the test document 155.

To this end, the workflow engine 123 retrieves any workflow history 136 and workflow definition 153 from the data store 112 for such workflow instance 133. In some embodiments, an initial state for the workflow instance 133 may be specified by the test document 155. The workflow engine 123 also obtains the data associated with the respective workflow instance 133 from the data store 112 and/or other location. Once the respective workflow history 136, workflow definition 153, and other information embodying the workflow instance 133 are obtained, then the workflow engine 123 may begin processing the workflow instance 133. The test engine 125 may establish a communications interface with the workflow engine 123 such that the test engine 125 obtains the state of the workflow instance 133, as well as provides input required for one or more of the various actions of the workflow instance 133.

Once the workflow history 136 and other information embodying the workflow instance 133 are received by the respective workflow engine 123, then the workflow engine 123 processes the workflow definition 153 and examines the workflow history 136 in order to determine a next action to be taken for the respective workflow instance 133. To this end, the generic workflow engine 123 becomes a functional embodiment of the workflow definition 153 that is configured to review the workflow history 136 and identify a next action to be taken for the workflow instance 133.

The workflow engine 123 may determine that the next action of the workflow instance 133 requires input that would typically be provided by a user or an application executing on a computing device. Upon obtaining the state of the workflow instance 133, the test engine 125 may determine if the test document 155 specifies an input for the next action. If such an input is provided in the test document 155, the test engine 125 may communicate the input to the workflow engine 123. Alternatively, if the test document 155 does not specify an input for a given action, the test engine 125 may obtain the input from a user through a user-interface and/or from another input source as can be appreciated.

As a non-limiting example, an action of a workflow definition 153 may be to obtain an order number of an order to be processed for shipping. During ordinary operation of the workflow instances 133, the workflow engine 123 may obtain this order number from a user, from the data store 112, or through another operation specified in the workflow definition 153. However, if the test document 155 associated with the workflow definition 153 under test specifies an input for the particular action, the test engine 125 may bypass the input procedure defined for the action. In the present example, the test engine 125 may cause the workflow engine 123 executing the workflow instance 133 to bypass the input source for the action and instead provide the order number (i.e., the input) specified in the test document 155.

In some embodiments, the test document 155 may contain references, scripts, network links, and/or other dynamic, "run-time" sources for providing input. Furthermore, a test document 155 may contain a mixture of static and dynamic input sources. Returning to the previous example, the test document 155 may specify one or more order numbers, as well as, for example, a uniform resource identifier (URI) providing a link to another source of order numbers.

In other embodiments, the action of a workflow definition 153 may comprise one or more sub-tasks, which may themselves continue to be further subdivided. As with the singular actions, the test document 155 associated with the workflow definition 153 may specify input data associated with one or more of the sub-tasks and/or other lineal tasks of an action. As a non-limiting example, an action of a workflow definition 153 may be to obtain payment for an order. The action may be divided into sub-tasks such as obtaining a payment method from a user, submitting a request for payment using the payment method, and providing confirmation of the payment processing to the user.

Upon obtaining the input for the action of the workflow instance 133, the workflow engine 123 schedules an activity 173 that performs or facilitates performance of the next action and any sub-tasks to be executed with respect to the workflow instance 133. To this end, this may involve placing the workflow instance 133 in a queue associated with a respective activity 173 to be performed.

Once the activity 173 indicates the next action has been completed, the activity 173 sends a message to the workflow engine 123 that such processing is complete. Thereafter, the test engine 125 may compare the data associated with the state of the workflow instance 133 after completing the activity 173 with the expected state of the workflow instance specified by the test document 155. Such a testing scenario may permit testing of not only the operation of the workflow instance 133, but potentially the operation of one or more applications 163 carrying out the action. For example, an action of a workflow definition 153 may be to obtain payment for an order. The action may be divided into sub-tasks such as obtaining a payment method from a user, submitting a request for payment using the payment method, and providing a payment confirmation number to the user. In this example, submitting a request for payment may comprise the application 163 obtaining authorization for payment.

If the payment method specified in the test document 155 is an identifier for an expired gift certificate, the expected state of the workflow instance 133 may be an error state with no defined payment confirmation number provided by the application 163. If the state of the workflow instance 133, including the data returned by the application 163, matches the expected state of the test document 155, the test engine 125 may record the results of the test of this action in the workflow log 139, and the workflow instance 133 may proceed to the next action. Alternatively, if the states do not match, the test engine 125 may record the event as a state mismatch. Additionally, based upon the state mismatch, the test engine 125 may terminate the execution of the particular workflow instance 133, attempt to repeat the action, restart the workflow instance 133 from the beginning, and/or other possible responses. In some embodiments, the response to a state mismatch for a given expected state may be specified by the test document 155.

It should be noted that a workflow instance 133 created for testing purposes may or may not be executed to completion, even if the workflow instance 133 does not deviate from expected states of the test document 155. For various possible reasons, the workflow engine 123 or the test engine 125 may determine that the execution of the particular workflow instance 133 should end. Such a "terminal" action may comprise an action or task inherent in the workflow of the workflow instance 133, or such action may comprise closing the workflow instance 133 due to the fact that the workflow is complete. If the workflow is complete, then the workflow engine 123 closes the workflow instance 133 by performing any needed closing tasks without applying the workflow instance 133 to an activity 173 as can be appreciated. Alternatively, an activity 173 may be employed that performs the closing tasks.

In addition to the foregoing, the workflow engine 123 also records events in the respective workflow histories 136 of the workflow instances 133 that it handles. As non-limiting examples, such events may comprise receiving input for a workflow instance 133 and the source of the input, the workflow engine 123 determining a next action for the workflow instance 133 and the basis for determining the action, initiating an activity 173 for the workflow instance 133, receiving a workflow instance 133 from an activity 173 after completion, an indication that a workflow instance 133 has completed or otherwise terminated, and/or other events. In addition, events may record various failure conditions such as the failure of a workflow engine 123 to timely determine the next action to be performed, the failure of an activity 173 to perform one or more tasks with respect to the workflow for a workflow instance 133, and/or other possible failure states.

In some embodiments, the synthesis engine 127 may correlate the workflow histories 136 of prior executions of various workflow instances 133a-N in order to produce and/or extend the testing scenarios of the test documents 155a-N. To this end, the synthesis engine 127 may identify the prior executions of workflow instances 133 sharing the same workflow definition 153. The workflow instances 133 may be correlated to identify common paths of execution taken from among the various potential paths of execution provided by the associated workflow definition 153. Once the synthesis engine 127 identifies the common paths among the workflow instances 133, the actions, as well as inputs, from these paths may be correlated and inserted into a test document 155 associated with the workflow definition 153. Furthermore, the expected states of the workflow instances 133 that result from each action and input combination may also be correlated and included within the test document 155. Thereafter, the test document 155 produced by the synthesis engine 127 may be made available in the data store 112 for use and/or further editing.

Figure 2:
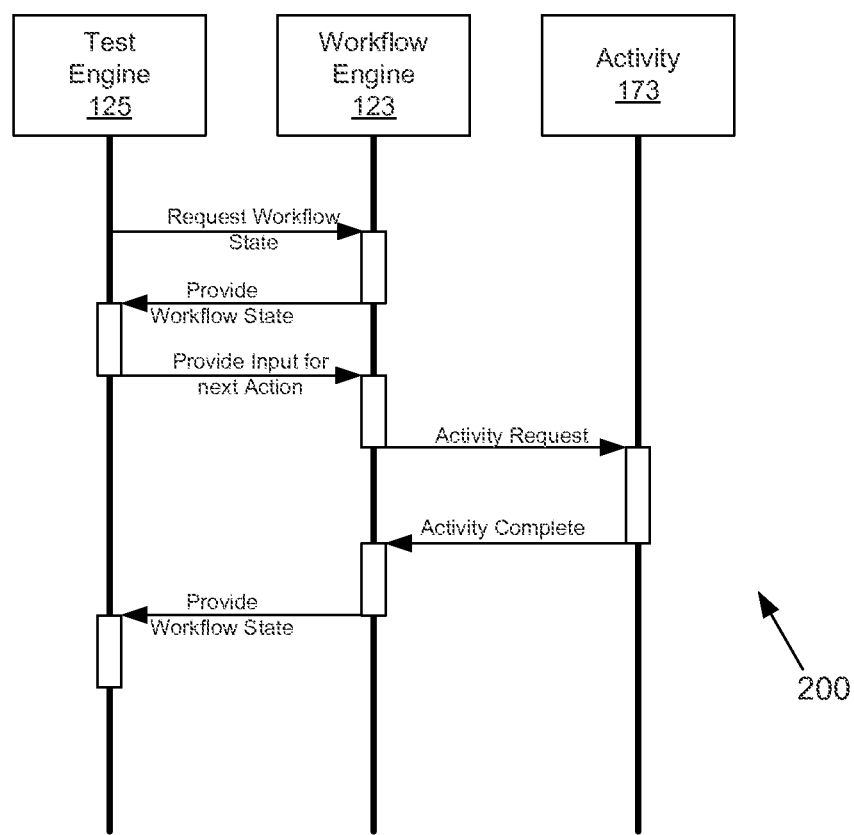
FIG. 2 is a drawing of a communication diagram that illustrates one example of communication between various components in a computing environment in the networked environment of FIG. 1 according to an embodiment of the present disclosure.

Referring next to FIG. 2, shown is a communication diagram 200 that illustrates one example of communication occurring between the test engine 125, the workflow engine 123, and an activity 173 during execution of a workflow instance 133 (FIG. 1) as described above according to an embodiment of the present disclosure. To begin, the test engine 125 requests the current state of a particular workflow instance 133 executed by the workflow engine 123. The workflow engine 123 requests the workflow definition 153 (FIG. 1), workflow history 136 (FIG. 1), and the information embodying the respective workflow instance 133 from the data store 112 (FIG. 1). Upon receiving the data, the workflow engine 123 determines the next action to be taken for the workflow instance 133. To this end, the workflow engine 123 having embodied the workflow definition 153, then examines the workflow history 136 and determines the next action to be taken. Ultimately, the workflow engine 123 generates a directive indicating the next action to be taken with respect to the workflow instance 133.

In response, the workflow engine 123 may return the present state of the workflow instance 133. The state information returned may include the workflow history 136 for the workflow instance 133, whether an action is currently underway, a next action for the workflow instance 133, whether any input is required for the next action and the format of the input, and/or other data associated with execution of the workflow instance 133 as can be appreciated.

If input is required for the next action, the test engine 125 may provide input specified for the action within the test document 155 (FIG. 1). In response, the workflow engine 123 may initiate an activity 173 for the next action, as well as potentially provide the input specified by the test document 155 for the action. All needed data to perform the action may be included in the activity request, or the activity request may include a pointer that indicates where such information is stored to be accessed by the respective activity 173. When sending the activity request, the workflow engine 123 may record an event in the workflow history 136 of the respective workflow instance 133. The activity 173 then proceeds to schedule, perform, and/or facilitate performance of the respective action associated with the workflow instance 133. As discussed previously, an action of a workflow may comprise one or more sub-tasks. Each of these sub-tasks or other lineal tasks may themselves require an activity 173. As a result, one action of a workflow definition 153 may require one or more activities 173 to schedule, perform, and/or facilitate performance of the respective action associated with the workflow instance 133. Additionally, one or more of the actions and/or sub-tasks of a workflow instance 133 may be performed asynchronously.

Once the activity 173 indicates the next action has been completed, the activity 173 sends a message to the workflow engine 123 that such processing is complete. Thereafter, the workflow engine 123 may provide an update of the state of the workflow instance 133 to the test engine 125. As described previously, the test engine may compare the state of the workflow instance 133 with the expected state provided by the test document 155. If the state of the workflow instance 133 matches the expected state of the test document 155, the test engine 125 may record the results of the test of this action in the workflow log 139 (FIG. 1), and the workflow instance 133 may proceed to the next action. Alternatively, if the states do not match, the test engine 125 may record the event as a state mismatch and potentially take further responsive action.

Figure 3:
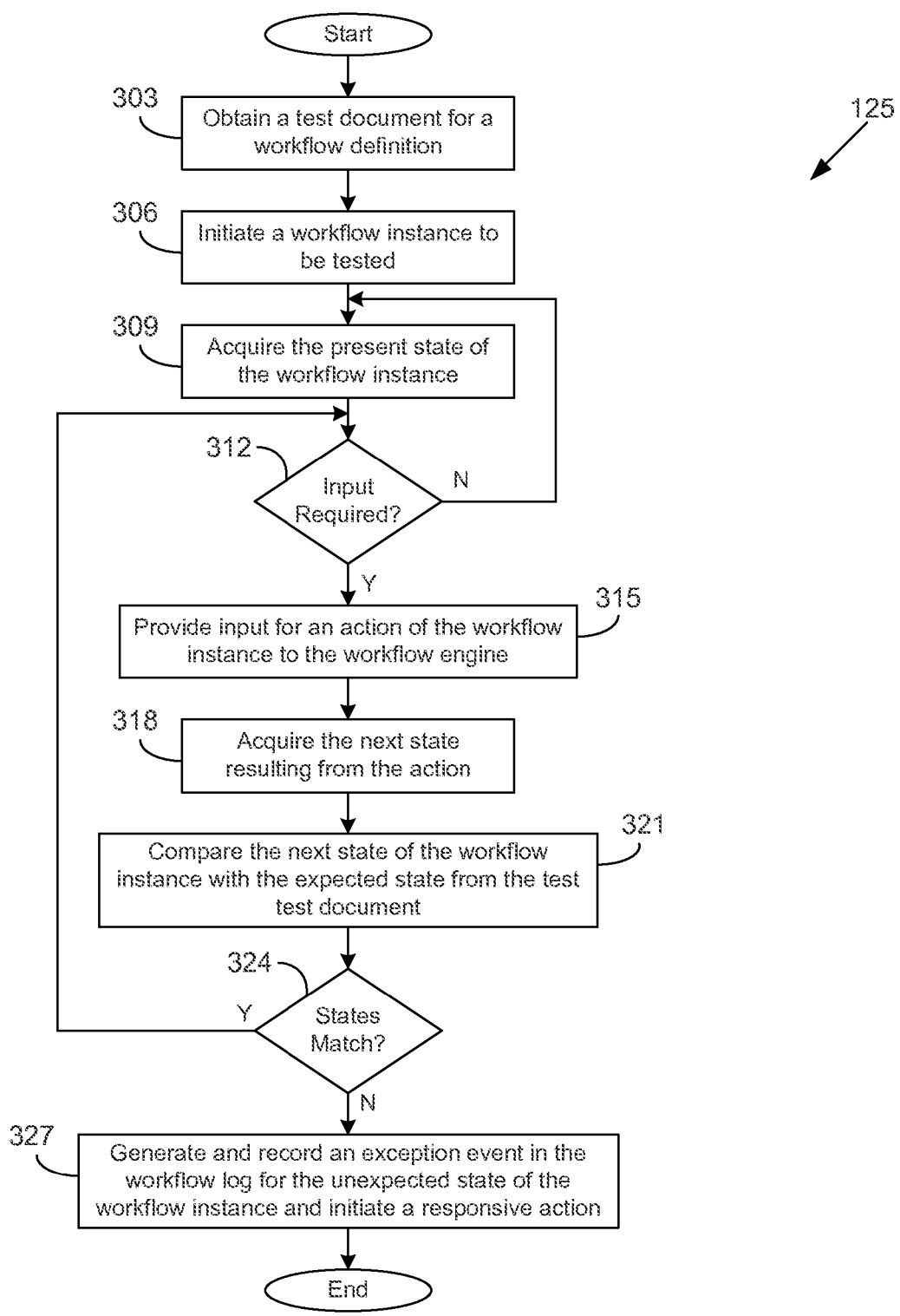
FIG. 3 is a flowchart illustrating one example of functionality implemented as portions of a test engine executed in the computing environment in the networked environment of FIG. 1 according to various embodiments of the present disclosure.

Turning now to FIG. 3, shown is a flowchart that provides one example of the operation of the test engine 125 according to various embodiments. It is understood that the flowchart of FIG. 3 merely provides an example of the many different types of functional arrangements that may be employed to implement the operation of the test engine 125 as described herein. As an alternative, the flowchart of FIG. 3 may be viewed as depicting an example of steps of a method implemented in the computing environment 103 (FIG. 1) according to one or more embodiments.

This portion of the test engine 125 may be executed based at least upon a workflow definition 153 (FIG. 1) being selected for testing by the test engine 125. To begin, in block 303, the test engine 125 obtains a test document 155 (FIG. 1) associated with the workflow definition 153. Then, in block 306, the test engine 125 may initiate a workflow instance 133 (FIG. 1), where the workflow instance 133 is an instance of the given workflow definition 153. In some embodiments, the test engine 125 may be provided with an identifier for a pre-existing workflow instance 133, thereby bypassing the need to create a new instance.

Next, in block 309, the workflow engine 123 (FIG. 1) retrieves any workflow history 136 (FIG. 1) and workflow definition 153 from the data store 112 (FIG. 1) for such workflow instance 133. Once the workflow history 136 and other information embodying the workflow instance 133 are received by the respective workflow engine 123, then the workflow engine 123 processes the workflow definition 153 and examines the workflow history 136 in order to determine a next action to be taken for the respective workflow instance 133.

Then, in block 312, the test engine 125 determines whether input is required for the next action based upon the state information obtained for the workflow instance 133. If not input is required, execution of the test engine returns to block 309. Alternatively, if input is required, execution of the test engine 125 proceeds to block 315. At block 315, the test engine 125 may communicate the input to the workflow engine 123. If the test document 155 does not specify an input for a given action, the test engine 125 may obtain the input from a user through a user-interface and/or from another input source as can be appreciated.

Continuing, at block 318, the test engine 125 may obtain the state of the workflow instance 133 resulting from performance of the action. Moving on, at block 321, the test engine 125 may compare the data associated with the state of the workflow instance 133 after completing the activity 173 (FIG. 1) with the expected state of the workflow instance specified by the test document 155. Such a comparison may permit testing of not only the operation of the workflow instance 133, but potentially the operation of one or more applications 163 (FIG. 1) carrying out the action.

Next, at block 324, the test engine 125 determines whether the state of the workflow instance 133, including the data returned by the application 163 (FIG. 1), matches the expected state of the test document 155. If the states match, execution of the test engine 125 returns to block 312 to determine if the present state of the workflow instance requires input. Alternatively, if the states do not match, in block 327, the test engine 125 may record the event in the workflow log 139 (FIG. 1) as a state mismatch and initiate a responsive action to the mismatch as described previously. Thereafter, this portion of the execution of the test engine 125 may end as shown.

Figure 4:
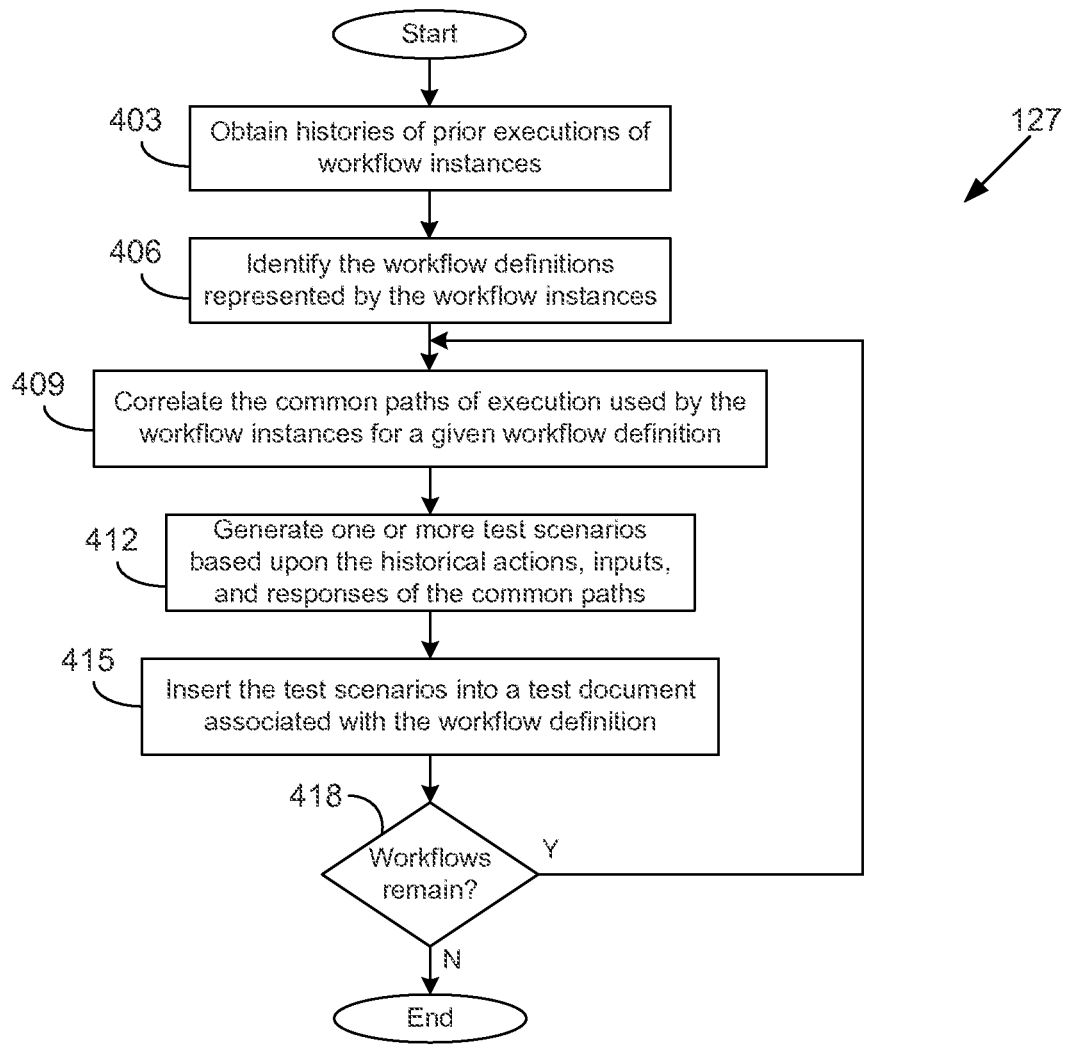
FIG. 4 is a flowchart illustrating one example of functionality implemented as portions of a synthesis engine executed in the computing environment in the networked environment of FIG. 1 according to various embodiments of the present disclosure.

With reference to FIG. 4, shown is a flowchart that provides one example of the operation of the synthesis engine 127 according to various embodiments. It is understood that the flowchart of FIG. 3 merely provides an example of the many different types of functional arrangements that may be employed to implement the operation of the synthesis engine 127 as described herein. As an alternative, the flowchart of FIG. 4 may be viewed as depicting an example of steps of a method implemented in the computing environment 103 (FIG. 1) according to one or more embodiments.

This portion of the synthesis engine 127 may be executed based at least upon a request from an operator to examine workflow histories 136 (FIG. 1) in order to produce one or more test documents 155 (FIG. 1). To begin, in block 403, the synthesis engine 127 may obtain workflow histories 136 associated with one or more of prior executions of various workflow instances 133a-N (FIG. 1). Next, in block 406, the synthesis engine 127 may identify the workflow definitions 153a-N (FIG. 1) represented by prior executions of workflow instances 133a-N.

Then, in block 409, the synthesis engine 127 may correlate the various workflow instances 133 associated with a given workflow definition 153 in order to identify common paths of execution taken from among the various potential paths of the workflow definition 153. Continuing, in block 412, the synthesis engine 127 may generate one or more test scenarios based upon the various actions, inputs, and resulting states taken along these common paths. Next, in block 415, the synthesis engine 127 may insert the test scenarios in the test document 155 associated with the workflow definition 153. Thereafter, in block 418, the synthesis engine 127 may determine if further workflow definitions 153a-N were represented in the workflow histories 136 for which the workflow instances 133a-N have not been examined. If more workflow definitions 153a-N remain, execution of the synthesis engine 127 returns to box 409. Alternatively, if no further workflow definitions 153a-N exist for which the associated workflow instances 133a-N have not been examined, this portion of the synthesis engine 127 ends as shown.

Figure 5:
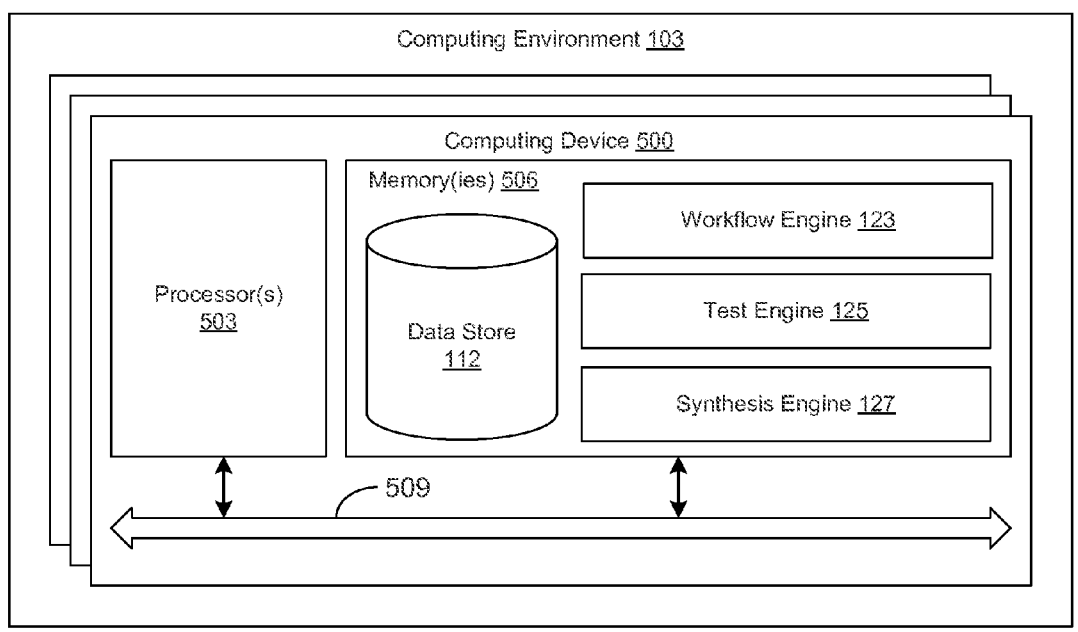
FIG. 5 is a schematic block diagram that provides one example illustration of the computing environment employed in the networked environment of FIG. 1 according to various embodiments of the present disclosure.

Turning now to FIG. 5, shown is a schematic block diagram of the computing environment 103 according to an embodiment of the present disclosure. The computing environment 103 may comprise, for example, one or more computing devices 500. A computing device 500 includes at least one processor circuit, for example, having a processor 503 and a memory 506, both of which are coupled to a local interface 509. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the workflow engine 123, the test engine 125, the synthesis engine 127, and potentially other applications. Also stored in the memory 506 may be a data store 112 and other data. In addition, an operating system may be stored in the memory 506 and executable by the processor 503.

It is understood that there may be other applications that are stored in the memory 506 and are executable by the processors 503 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and the memory 506 may represent multiple memories 506 that operate in parallel processing circuits, respectively. In such a case, the local interface 509 may be an appropriate network 109 (FIG. 1) that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the workflow engine 123, the test engine 125, the synthesis engine 127, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 3 and 4 show the functionality and operation of an implementation of portions of the test engine 125 and synthesis engine 127, respectively. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowcharts of FIGS. 3 and 4 show a specific order of execution, it is understood that the order of execution may differ from that which is depicted. For example, the order of execution of two or more blocks may be scrambled relative to the order shown. Also, two or more blocks shown in succession in FIGS. 3 and 4 may be executed concurrently or with partial concurrence. Further, in some embodiments, one or more of the blocks shown in FIGS. 3 and 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the workflow engine 123, the test engine 125, and the synthesis engine 127, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, the program comprising:

code that acquires a test document associated with a workflow definition in response to receiving the workflow definition comprising a plurality of possible paths of execution, individual ones of the plurality of possible paths of execution comprising a sequence of a plurality of actions, the test document comprising a programmatic input source configured to provide an input for at least one of the plurality of actions of the workflow definition and an expected state for the workflow definition based at least on the input;

code that places a workflow instance in a queue accessible to a workflow engine in the computing device, the workflow instance being an instance of the workflow definition;

code that provides the input from the programmatic input source for the at least one of the plurality of actions of the workflow instance to the workflow engine managing the workflow instance, the at least one of the plurality of actions determined based at least in part upon a present state of the workflow instance and being performed by a remote application, the remote application interfacing with the workflow engine and returning a result, the input being determined upon execution of the at least one of the plurality of actions of the workflow instance;

code that generates a comparison of a next state of the workflow instance to the expected state of the test document in response to receiving the next state of the workflow instance, the next state being based at least in part upon the present state, the at least one of the plurality of actions, the input, and the result, wherein the comparison comprises the result of the remote application; and code that restarts the workflow instance at a beginning of the workflow instance based at least in part on a difference in the comparison.

2. The non-transitory computer-readable medium of claim 1, further comprising code that provides an initial state of the workflow instance, the test document further comprising the initial state.

3. The non-transitory computer-readable medium of claim 1, further comprising code that generates a plurality of common actions for use with future workflow instances, wherein the plurality of common actions are inserted within the test document and the plurality of common actions are based at least in part upon a transaction log from a plurality of prior executions of a plurality of prior workflow instances, the plurality of prior workflow instances being associated with the workflow definition.

4. A non-transitory computer-readable medium embodying a program executable in a computing device, the program comprising:

code that acquires a test document associated with a workflow definition comprising a plurality of possible paths of execution, individual ones of the plurality of possible paths of execution comprising a sequence of a plurality of actions, wherein the test document comprises a programmatic input source configured to provide an input for at least one of the plurality of actions of the workflow definition and an expected state for the workflow definition based at least in part on the input;

code that, in response to receiving the workflow definition, places a workflow instance in a queue accessible to a workflow engine in the computing device, the workflow instance being an instance of the workflow definition;

code that provides the input from the programmatic input source for the at least one of the plurality of actions of the workflow instance to the workflow engine managing the workflow instance, the at least one of the plurality of actions determined based at least in part upon a present state of the workflow instance and being performed by a remote application, the remote application interfacing with the workflow engine and returning a result, the input being determined upon execution of the at least one of the plurality of actions of the workflow instance;

code that, in response to receiving a next state of the workflow instance, generates a comparison of the next state of the workflow instance to the expected state of the test document, wherein the next state is based at least in part upon the present state, the at least one of the plurality of actions, the input, and the result, and wherein the comparison comprises the result of the remote application; and code that restarts the workflow instance at a beginning of the workflow instance based at least in part on a difference in the comparison.

5. The non-transitory computer-readable medium of claim 4, wherein the at least one of the plurality of actions comprises a plurality of sub-tasks and the input comprises at least one sub-input for the plurality of sub-tasks.

6. The non-transitory computer-readable medium of claim 5, wherein the at least one of the plurality of actions is not complete until the plurality of sub-tasks are completed.

7. A system, comprising:

at least one computing device; and a test engine executable in the at least one computing device, the test engine comprising:

logic that delivers an input for an action of a workflow instance, a test document executed by the test engine determining the input from a programmatic input source based at least in part upon the action, and a workflow engine executing the workflow instance determining the action based at least in part upon a present state of the workflow instance, the input being determined upon execution of the action of the workflow instance;

logic that, in response to receiving a next state of the workflow instance, compares the next state of the workflow instance to the test document, wherein the next state is determined by the workflow engine based at least in part upon the present state, the action, and the input, and wherein the test document comprises an expected state of the workflow instance; and logic that restarts the workflow instance at a beginning of the workflow instance based at least in part on a result of a comparison of the next state of the workflow instance to the test document.

8. The system of claim 7, wherein the workflow instance is an instance of a workflow definition comprising a plurality of possible paths of execution, and the test document is associated with the workflow definition.

9. The system of claim 8, further comprising logic that generates an additional test scenario that is inserted into the test document based at least in part upon a log of a plurality of prior instances of the workflow definition, the plurality of prior instances representing a subset of the plurality of possible paths of execution of the workflow definition.

10. The system of claim 9, wherein the log indicates that at least one of the plurality of prior instances of the workflow definition produced an error.

11. The system of claim 8, wherein the test engine further comprises logic that generates an event based at least in part upon a difference between the next state of the workflow instance and the expected state of the test document.

12. The system of claim 11, further comprising logic that instructs the workflow engine to repeat the action using the present state and the input, wherein the workflow engine is scheduled to perform the action associated with the present state for the next state of the workflow instance.

13. The system of claim 7, wherein the action is performed by a remote application, the remote application interfacing with the workflow instance and returning a result.

14. The system of claim 7, wherein the action comprises a plurality of sub-tasks and the input comprises at least one sub-input for the plurality of sub-tasks.

15. A method, comprising:

receiving, via at least one of one or more computing devices, a test document associated with a workflow definition, the test document comprising a programmatic input source configured to provide an input for an action of the workflow definition and an expected state for the workflow definition based at least in part on the input;

delivering, via at least one of the one or more computing devices, the input from the programmatic input source for the action of a workflow instance, the workflow instance being a first instance of the workflow definition executed by a workflow engine, and the action determined based at least in part upon a present state of the workflow instance, the input being determined upon execution of the action of the workflow instance;

receiving, via at least one of the one or more computing devices, a next state of the workflow instance, the next state being determined by the workflow engine based at least in part upon the present state, the action, and the input;

comparing, via at least one of the one or more computing devices, the next state of the workflow instance to the expected state specified by the test document; and restarting, via at least one of the one or more computing devices, the workflow instance at a beginning of the workflow instance in response to detecting a discrepancy between the next state of the workflow instance and the expected state specified by the test document in response to comparing the next state of the workflow instance to the expected state specified by the test document.

16. The method of claim 15, further comprising generating, via at least one of the one or more computing devices, an alarm based at least in part upon a difference between the next state of the workflow instance and the expected state of the test document.

17. The method of claim 15, wherein a portion of the test document is generated based at least in part upon a log from a prior execution of a prior workflow instance, the prior workflow instance being a second instance of the workflow definition.

18. The method of claim 15, wherein the action comprises at least one sub-task and the input comprises a sub-input for the at least one sub-task.

19. The method of claim 18, wherein the action is not complete until the at least one sub-task is completed.

20. The method of claim 15, wherein the test document is a JavaScript object notation (JSON) document.

21. The method of claim 15, further comprising initiating, via at least one of the one or more computing devices, the workflow instance based at least in part upon the workflow definition specified by the test document.

22. The method of claim 15, wherein the action is performed by a remote application, the remote application interfacing with the workflow instance and returning a result.

23. The method of claim 22, wherein comparing, via at least one of the one or more computing devices, the next state of the workflow instance to the expected state of the test document further comprises performing a comparison of the result from the remote application to the expected state of the test document, the expected state of the test document comprising an expected result from the remote application.

24. The non-transitory computer-readable medium of claim 3, further comprising:
   code that generates an additional test scenario based at least in part upon the plurality of common actions, a plurality of corresponding inputs associated with the plurality of common actions, and a corresponding plurality of results associated with the plurality of common actions; and
   code that inserts the additional test scenario within the test document.

* * * * *